United States Patent [19]

Wolff

[11] Patent Number: 4,614,111
[45] Date of Patent: Sep. 30, 1986

[54] POSITION SENSOR FOR FUEL INJECTION APPARATUS

[76] Inventor: George D. Wolff, P.O. Drawer 9407, Winter Haven, Fla. 33880

[21] Appl. No.: 701,935

[22] Filed: Feb. 15, 1985

[51] Int. Cl.⁴ .............................................. G01M 15/00
[52] U.S. Cl. ..................................... 73/119 A; 29/595
[58] Field of Search ...................... 73/119 A, DIG. 3; 239/73, 533.3, 533.4; 330/6; 340/870.31; 29/595

[56] References Cited

U.S. PATENT DOCUMENTS 4,386,522 6/1983 Wolff ................................ 73/119 A Primary Examiner—Jerry W. Myracle
Attorney, Agent, or Firm—Duckworth, Allen, Dyer

[57] ABSTRACT

A sensor assembly for detecting the position of a fuel injection element such as a needle injector, poppet valve or the like in fuel injection apparatus of an internal combustion engine includes a lead frame assembly having a plurality of leads of a predetermined length and a Hall-effect sensing device mechanically and electrically connected to contact surfaces associated with the leads. A first encapsulation layer is formed about the contact surfaces and Hall-effect device utilizing a mold process which results in the formation of projections above the surface of the Hall-effect device in the area adjacent the electrical contacts. The leads of the lead frame assembly are bent perpendicularly to the plane of the Hall-effect device and attached to a multi-lead wire. The assembly is encapsulated in a second mold using the projections as positive stops to position the assembly in the mold. An end of the multi-lead wire, the leads and the Hall-effect device are all thereby encapsulated and dimensioned for insertion into and out of a passageway and fuel injection apparatus.

20 Claims, 4 Drawing Figures

4,614,111

POSITION SENSOR FOR FUEL INJECTION APPARATUS

BACKGROUND OF THE INVENTION

The present invention relates generally to internal combustion engines, and more particularly relates to techniques for sensing the position of a needle or poppet valve in order to maximize the efficiency of engine operation and reduce unwanted exhaust emissions.

The present invention is an improvement over that disclosed in my U.S. Pat. No. 4,386,522 issued June 7, 1983, the disclosure of which is hereby incorporated by reference. In my previous patent I disclosed a sensor for detecting the opening of a fuel injection means such as a needle injector, poppet valve or the like in fuel injection apparatus of an internal combustion engine, the sensor comprising a header of an electrically insulating material having opposed first and second surfaces, and plural conductive leads, each lead separately coupled to the first surface of the header. Sensing means, such as a Hall effect detector, is mounted upon the second surface of the header for detecting the magnectic field and changes therein responsive to movement of the fuel injection means (such as the needle valve or poppet valve) in an internal combustion engine. Metalization means between the first and second surfaces provide innerconnection between the leads and the sensor. The leads, header and detector are all encapsulated, and are dimensioned for insertion into and out of the passageway in fuel injection apparatus including the fuel injection means.

Although the invention disclosed in my U.S. Pat. No. 4,386,522 serves a useful purpose and overcomes many of the deficiencies of the prior art, the production or manufacture of the position sensor using a specially constructed ceramic header is relatively expensive and difficult to manufacture. Furthermore, each header requires separate handling during wire bonding and encapsulation further increasing its cost of production.

SUMMARY OF THE INVENTION

The present invention discloses an improved position sensor for detecting the opening of a fuel injection means and a method for producing such a position sensor which is more cost effective through elimination of the use of a header in the manufacture of the sensor. The improved position sensor is manufactured using a lead frame of the type used in the manufacture of micro-electronic parts. A lead frame is provided having a predetermined pattern of contact surfaces with a lead attached to each of the contact surface. A sensing means, such as the Hall detector, in the form of an integrated circuit is mounted on the contact surfaces and contact wires are attached from contact pads on the integrated circuit to a corresponding contact surface on the lead frame assembly. The integrated circuit and contact surfaces of the lead frame assembly are thereafter encapsulated in a first encapsulation mold. The lead frame is trimmed leaving leads extending from the first encapsulated circuit having a predetermined length. The extended leads are then bent perpendicularly to the plane of the integrated circuit and lead wires are attached to each of the leads from the circuit. The sensor with attached lead wires is placed in a second mold and a second encapsulation process performed in order to form the final sensor. The lead wire, the leads from the integrated circuit and the integrated circuit are all thereby encapsulated and are dimensioned for insertion into and out of the passageway in fuel injection apparatus including the fuel injection means. Preferably the fuel injection means is part of fuel control apparatus in a diesel engine.

In a preferred embodiment, the first encapsulation mold contains depressions on one surface positioned adjacent to the electrical contacts on the integrated circuit. In forming the first encapsulation, the encapsulating material flows into the depressions creating projections over the contact wires. These projections serve to protect the connecting wires which are wire bonded to the contact pads and also serve to position the encapsulated sensing device at a predetermined distance from the end of the mold during the second encapsulation process. The first encapsulation mold also has radial corners which serve as guides for placing the sensor into the second mold and further define the diameter of the sensor assembly.

DRAWING

DETAILED DESCRIPTION

Figure 1:
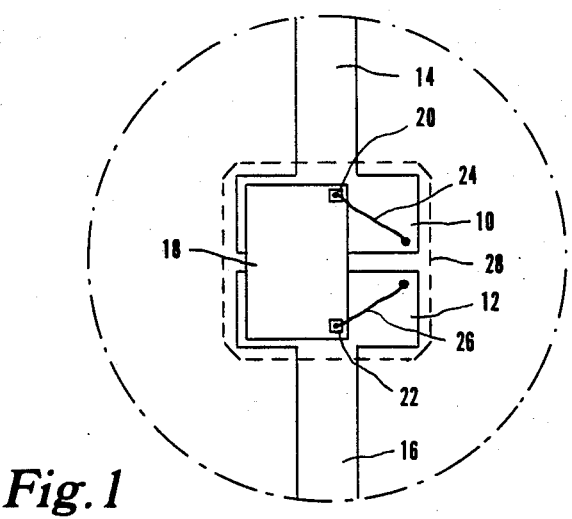
FIG. 1 is a top plan view of one integrated circuit sensing device mounted on a lead frame according to the present invention.

Referring now to FIG. 1, there is illustrated a lead frame assembly having two contact surfaces 10 and 12 and two corresponding leads 14 and 16 respectively. Although only a two lead device is being described, it should be understood that the method disclosed herein can be used to assemble devices with more than two leads. Furthermore, it will be appreciated by those skilled in the art that a plurality of devices may be simultaneously assembled on a lead frame in a manner well known in the art. An integrated circuit device 18, preferably a Hall effect sensor, is mounted upon the contact surfaces 10 and 12, but electrically isolated therefrom. The integrated circuit (IC) chip includes contact pads 20 and 22 which serve as electrical input and output terminals for the electrical circuit on the IC chip. Each of the contact pads 20 and 22 are electrically bonded to a corresponding one of the contact surfaces 10 and 12 of the lead frame assembly. The wire bonding techniques for electrically connecting the contact pads and contact surfaces are well known in the art.

The contact surfaces 10 and 12 and the associated leads 14 and 16 may be plated in order to facilitate the mechanical and electrical bonding of the chip 18 to the lead frame assembly. This plating may be in the form of complete plating of the lead frame assembly or alternately the plating may be limited to only those areas of the lead frame assembly to which contact, either mechanical or electrical, is to be made. It should be noted that the chip 18 is mechanically mounted off center of the contact surfaces 10 and 12 in order to expose a sufficient portion of the lead frame surface for wire bonding.

After the chip 18 has been mechanically and electrically bonded to the contact surfaces 10 and 12, the assembly is placed in a mold having a shape essentially as shown by the dashed lines 28. The assembly is then encapsulated, preferably using a transfer-molding insulating material. As will become apparent in the discussion of FIGS. 2 and 3, the mold has first and second depressions which are centered over the contact wires 24 and 26 which will result in cone-shaped projections of the encapsulating material being formed over these contact wires to protect the wires.

After the encapsulating material has set, the lead frame assembly and chip 18 are removed from the mold and the excess portion of the lead frame assembly trimmed away in a manner well known in the art.

Figure 2:
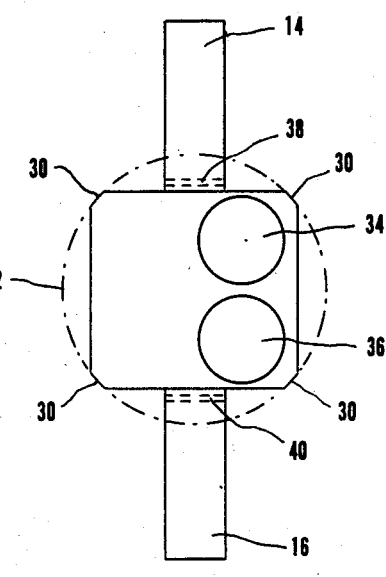
FIG. 2 is a top plan view of the sensing device of the present invention after a first encapsulation.

Referring now to FIG. 2, there is shown a top view of the resulting encapsulated sensor assembly after the first step of encapsulation. The encapsulated assembly has radial corners 30 which lie on the circumfrence of an imaginary circle 32. The imaginary circle 32 represents a circle having a diameter about equal to the outside diameter of a multi-lead wire which is to be connected to the sensor assembly. The projections 34 and 36 formed over the contact wires 24 and 26 are also visible in FIG. 2. The dashed lines 38 and 40 represent etched surfaces or perforations in the leads 14 and 16 respectively. As will become apparent, these etched lines are useful in defining the point at which the leads 14 and 16 can be bent. Such etching or perforations may be formed in the leads as part of the lead frame fabrication prior to encapsulation.

Figure 3:
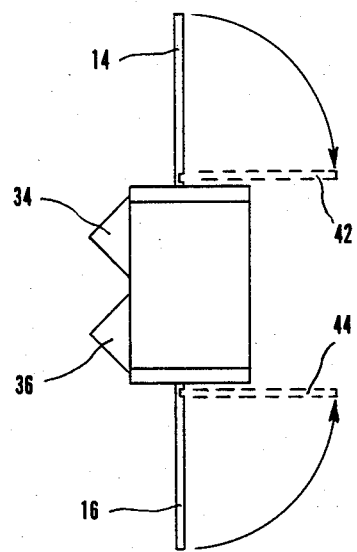
FIG. 3 is a side plan view of the apparatus in FIG. 2.

FIG. 3 is a side view of the sensor according to the present invention after the first encapsulation process illustrated in FIG. 2. The view of FIG. 3 better illustrates the projections 34 and 36 which preferably are cone shaped projections above the surface of the encapsulated sensor. The dashed lines 42 and 44 represent the position of the leads 14 and 16 after bending at the etched lines 38 and 40. The conical projections 34 and 36 fulfill the double function of protecting the wire bonds to the chip 18 during handling and also provide a positive stop for the location of the assembly in the final mold for the second encapsulation process.

Figure 4:
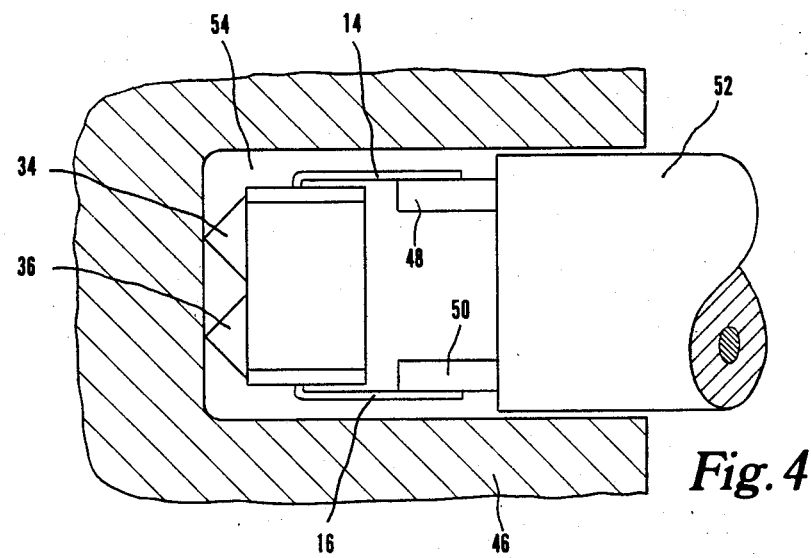
FIG. 4 is a partial cross-sectional view of the apparatus according to the present invention positioned in a mold for the second encapsulation process.

Referring now to FIG. 4, there is shown a partial cross-section of the inventive sensor assembly in a mold 46 for the final encapsulation process. The leads 14 and 16 have now been bent in a direction perpendicular to the plane of the encapsulated chip 18. Lead wires 48 and 50 extend from a multi-lead wire or cable 52. The wires 48 and 50 are attached to the leads 14 and 16 by welding, brazing or soldering or other means well known in the art for making a positive electrical connection. The conical projections 34 and 36 can be seen to serve as a guide for positioning the sensor assembly in the encapsulation mold 46. The projections 34 and 36 assure that the sensing device 18 is spaced a pre-determined distance from the end surface of the final encapsulated sensor assembly. For the second encapsulation, the mold 46 containing the end of the wire cable 52 is filled with a transfer-molding insulating material which is then allowed to set before removing the encapsulated assembly. It should be noted that the radial corners 30 abutt the sides of the mold cavity 54 in order to position the first encapsulated sensor accurately within the cavity for the second encapsultion. After the second and final encapsulation, the sensor element and wire 52 constitute a single unit.

As disclosed in my previous U.S. Pat. No. 4,386,522 the final encapsulated sensor assembly is of a size to fit in the passageway corresponding to the passageway in a fuel injection nozzle (referred to in the previous application with reference numeral 52) and is positioned in the bottom of that passageway in a holder of a non-magnetic material preferably stainless steel. The sensor works in conjunction with a permanent magnet also positioned in the fuel injection system such that the opening or closing of a fuel injection nozzle can be detected by relative movement of the magnet with respect to the sensor.

There has thus been described an improved method in manufacture of a sensing assembly for detecting the opening of a fuel injection valve in a fuel injection control system for an internal combustion engine. While the invention has been disclosed in a preferred embodiment as a sensor for use in such a fuel injection control system, it will be apparent to those skilled in the art that the sensor may be utilized in conjunction with other types of valves wherein it is desired to detect opening or closing thereof. Accordingly, it is intended that the invention not be limited to the illustrative embodiment, but be given tht scope commensurate with the spirit of the appended claims.

I claim:

1. A sensor assembly for detecting the position of a fuel injection device in a fuel injection apparatus of an internal combustion engine, said sensor comprising:
    an integrated circuit sensing element;
    a lead frame assembly having a plurality of leads of a predetermined length;
    electrically conductive means attaching contact pads on said integrated circuit sensing element to corresponding ones of said leads;
    first encapsulating means about said sensing element and a portion of said leads, said first encapsulating means forming projections above a surface of said sensing element;
    a multi-lead wire having a plurality of lead wires, each of said lead wires having an end attached to a corresponding one of said leads of said lead frame assembly; and
    second encapsulation means about said sensing element, said lead frame assembly and said end of said multi-lead wire forming said sensor assembly, a face of said sensor assembly being coterminous with peaks of said projections.

2. The sensor assembly of claim 1 wherein said sensing element comprises a Hall-effect sensor.

3. The sensor assembly of claim 1 wherein each of said leads of said lead frame assembly are perpendicular to a plane of a surface of said sensing element.

4. The sensor assembly of claim 1 wherein said sensor assembly is dimensioned for insertion into and out of said fuel injection device.

5. The sensor assembly of claim 1 wherein said projections are formed over said electrically conductive means.

6. The sensor assembly of claim 1 wherein said leads of said lead frame assembly have partially etched areas adjacent said first encapsulation to facilitate bending.

7. The sensor assembly of claim 1 wherein said leads of said lead frame assembly have perforated areas adjacent said first encapsulation to facilitate bending.

8. The sensor assembly of claim 1 wherein said leads extend through said first encapsulation and are enclosed within said second encapsulation.

9. The sensor assembly of claim 1 wherein said lead frame assembly is plated.

10. The sensor assembly of claim 9 wherein the lead frame assembly is plated only in areas used for electrical bonding.

11. The sensor assembly of claim 1 wherein said first and second encapsulating means comprises a transfer-molding insulating material.

12. The sensor assembly of claim 1 wherein said first encapsulation means includes radial corners for positioning the assembly in a mold for forming said second encapsulation means.

13. The sensor assembly of claim 12 wherein said radial corners are located on a circumference of a circle.

14. The sensor assembly of claim 13 wherein a diameter of said circle is substantially equal to an outside diameter of said multi-lead wire.

15. The sensor assembly of claim 1 wherein said projections are conical.

16. A sensor assembly for detecting the position of valve means in fluid control apparatus, of a fuel injection apparatus, said sensor assembly comprising:
an integrated circuit sensing element;
a lead frame assembly having a plurality of leads;
electrically conductive means attaching contact pads on said integrated circuit sensing element to corresponding ones of said leads; and
encapsulation means formed about said sensing element and a portion of said leads, said encapsulation means forming projections above a surface of said sensing element, peaks of said projections defining a plane for positioning said sensing element a predetermined distance from an end surface of said sensor.

17. The sensor assembly of claim 16 wherein the valve means in fluid control apparatus comprises diesel fuel injection means in fuel injection apparatus of an internal combustion engine.

18. The sensor assembly of claim 17 wherein said sensor assembly includes conductor means electrically connected to said leads for transmitting signals from said sensing element.

19. The sensor assembly of claim 18 wherein said encapsulation means comprises:
first encapsulation means about said sensing element and a portion of said leads said first encapsulation means forming said projections; and
second encapsulation means about said first encapsulation means and a portion of said conductor means, said second encapsulation means having a first surface coterminous with said peaks of said projections for establishing said plane.

20. The sensor assembly of claim 19 wherein said conductor means comprises a multi-lead wire having a plurality of lead wires, each of said lead wires being attached to a corresponding one of said leads of said lead frame assembly.

* * * * *